(12) United States Patent
Shiono et al.

(10) Patent No.: US 10,196,499 B2
(45) Date of Patent: *Feb. 5, 2019

(54) CROSS-LINKABLE NITRILE RUBBER COMPOSITION AND CROSS-LINKED RUBBER

(71) Applicant: ZEON CORPORATION, Tokyo (JP)

(72) Inventors: Atsuhiro Shiono, Tokyo (JP); Kentarou Mori, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/113,550

(22) PCT Filed: Jan. 29, 2015

(86) PCT No.: PCT/JP2015/052462
§ 371 (c)(1),
(2) Date: Jul. 22, 2016

(87) PCT Pub. No.: WO2015/115521
PCT Pub. Date: Aug. 6, 2015

(65) Prior Publication Data
US 2017/0009051 A1    Jan. 12, 2017

(30) Foreign Application Priority Data

Jan. 30, 2014 (JP) .................................. 2014-015192
Mar. 20, 2014 (JP) .................................. 2014-058520

(51) Int. Cl.
| | | |
|---|---|---|
| C08K 5/00 | (2006.01) | |
| C08K 5/05 | (2006.01) | |
| C08K 5/13 | (2006.01) | |
| C08K 5/17 | (2006.01) | |
| C08K 5/34 | (2006.01) | |
| C08L 9/02 | (2006.01) | |
| C09K 3/10 | (2006.01) | |
| C08K 5/053 | (2006.01) | |
| C08L 13/00 | (2006.01) | |
| C08K 5/3445 | (2006.01) | |

(52) U.S. Cl.
CPC ............... C08K 5/05 (2013.01); C08K 5/053 (2013.01); C08K 5/13 (2013.01); C08K 5/17 (2013.01); C08K 5/34 (2013.01); C08K 5/3445 (2013.01); C08L 9/02 (2013.01); C08L 13/00 (2013.01); C09K 3/1006 (2013.01); C08K 5/0025 (2013.01); C09K 2200/0612 (2013.01)

(58) Field of Classification Search
CPC .. C08L 9/02; C08L 13/00; C08K 5/05; C08K 5/13
See application file for complete search history.

(56) References Cited

U.S. PATENT DOCUMENTS

| | | | | |
|---|---|---|---|---|
| 6,654,014 B2* | 11/2003 | Endo | .................. | G01C 21/3635 |
| | | | | 345/427 |
| 6,657,014 B1 | 12/2003 | Mori et al. | | |
| 9,458,275 B2* | 10/2016 | Mori | ..................... | C08F 236/12 |
| 2007/0037930 A1 | 2/2007 | Odagawa et al. | | |
| 2009/0234054 A1* | 9/2009 | Nagamori | .............. | C08K 5/098 |
| | | | | 524/263 |
| 2010/0168302 A1 | 7/2010 | Nagamori et al. | | |
| 2010/0256294 A1* | 10/2010 | Ikeda | ....................... | C08K 5/18 |
| | | | | 524/559 |
| 2011/0183875 A1* | 7/2011 | Soddemann | .............. | C08K 5/09 |
| | | | | 507/225 |
| 2012/0130009 A1* | 5/2012 | Qin | ......................... | B60C 1/00 |
| | | | | 524/575 |
| 2012/0172509 A1 | 7/2012 | Nagamori et al. | | |
| 2012/0214945 A1 | 8/2012 | Emori | | |
| 2013/0102725 A1 | 4/2013 | Nagamori et al. | | |
| 2014/0296404 A1 | 10/2014 | Nagamori et al. | | |
| 2015/0246991 A1 | 9/2015 | Mori | | |

FOREIGN PATENT DOCUMENTS

| | | | |
|---|---|---|---|
| CN | 101331183 A | | 12/2008 |
| CN | 102575066 A | | 7/2012 |
| JP | 2001-055471 A | | 2/2001 |
| JP | 2004137369 A | * | 5/2004 |
| JP | 2007031631 A | * | 2/2007 |
| JP | 2007-063429 A | | 3/2007 |
| JP | 2008-138048 A | | 6/2008 |
| JP | 2013-018936 A | | 1/2013 |
| WO | 2005/030859 A1 | | 4/2005 |
| WO | 2007/049651 A1 | | 5/2007 |
| WO | 2007/072900 A1 | | 6/2007 |
| WO | 2009/096518 A1 | | 8/2009 |
| WO | 2014/050853 A1 | | 4/2014 |

OTHER PUBLICATIONS

Mitsubishi (Organic Amine "ACTING SL" Mitsubishi Chemical Corporation. 2017, 2 pages).*
Machine translated English language equivalent of JP 2007-031631 (Feb. 2007, 11 pages).*
Machine translated English language equivalent of JP 2004137369 (May 2004, 10 pages).*
Feb. 3, 2017 Office Action issued in Chinese Patent Application No. 201580005503.0.
"Rubber Ingredients Handbook". Apr. 30, 2000, pp. 179 and 189-190.
"Rubber Industry Handbook Revised Edition Second Fascicle Compounding Ingredient". Oct. 31, 1989, pp. 164-165.

(Continued)

*Primary Examiner* — Brieann R Johnston
(74) *Attorney, Agent, or Firm* — Oliff PLC

(57) ABSTRACT

A cross-linkable nitrile rubber composition has a carboxyl group-containing nitrile rubber (A) with an iodine value of 120 or less, polyamine cross-linking agent (B), and at least one compound (C) selected from an aliphatic alcohol (c1) having 1 to 9 carbon atoms, hydroxyl group-containing aromatic compound (c2), and nitrogen-containing heterocyclic compound (c3).

17 Claims, No Drawings

(56) References Cited

OTHER PUBLICATIONS

Aug. 2, 2016 International Preliminary Report on Patentability issued in International Patent Application No. PCT/JP2015/052462.
Apr. 28, 2015 Search Report issued in International Patent Application No. PCT/JP2015/052462.
Jul. 19, 2017 extended European Search Report issued in European Application No. 15743365.7.

* cited by examiner

CROSS-LINKABLE NITRILE RUBBER COMPOSITION AND CROSS-LINKED RUBBER

TECHNICAL FIELD

The present invention relates to a cross-linkable nitrile rubber composition excellent in processability and scorch stability and able to give cross-linked rubber excellent in compression set resistance and to cross-linked rubber obtained using that cross-linkable nitrile rubber composition.

BACKGROUND ART

In the past, nitrile rubber (acrylonitrile-butadiene copolymer rubber) has been used as a material of rubber parts for automobile use such as hoses and tubes by taking advantage of its oil resistance, mechanical properties, chemical resistance, etc. Further, hydrogenated nitrile rubber (hydrogenated acrylonitrile-butadiene copolymer rubber) which is obtained by hydrogenating the carbon-carbon double bonds in the polymer main chain of nitrile rubber is further excellent in heat resistance, so is used for rubber parts such as belts, hoses, and diaphragms.

In view of such a situation, Patent Document 1 provides a cross-linkable nitrile rubber composition containing hydrogenated nitrile rubber having α,β-ethylenically unsaturated dicarboxylic acid monoester monomer units, a polyamine-based cross-linking agent, and a basic cross-linking accelerator. Using this composition, cross-linked rubber which is considerably improved in heat resistance and compression set resistance is obtained, but further improvement in compression set resistance has been sought. Further, the above cross-linkable nitrile rubber composition disclosed in the above Patent Document 1 is not necessarily sufficient in processability and scorch stability, so further improvement in the processability and scorch stability has been sought.

PRIOR ART DOCUMENTS

Patent Documents

Patent Document 1: Japanese Patent Publication No. 2001-55471A

SUMMARY OF INVENTION

Problem to be Solved by the Invention

The present invention has as its object the provision of a cross-linkable nitrile rubber composition excellent in processability and scorch stability and able to give cross-linked rubber excellent in compression set resistance and a cross-linked rubber obtained using that cross-linkable nitrile rubber composition.

Means for Solving the Problems

The inventors engaged in intensive research for achieving the above object and as a result discovered that by mixing, into a carboxyl group-containing nitrile rubber with an iodine value of 120 or less, a polyamine cross-linking agent, and at least one compound selected from an aliphatic alcohol having 1 to 9 carbon atoms, hydroxyl group-containing aromatic compound, and nitrogen-containing heterocyclic compound, it is possible to achieve the above object and thereby completed the present invention.

That is, according to the present invention, there is provided a cross-linkable nitrile rubber composition comprising a carboxyl group-containing nitrile rubber with an iodine value of 120 or less, polyamine cross-linking agent (B), and at least one compound (C) selected from an aliphatic alcohol (c1) having 1 to 9 carbon atoms, hydroxyl group-containing aromatic compound (c2), and nitrogen-containing heterocyclic compound (c3).

In the cross-linkable nitrile rubber composition of the present invention, the compound (C) is preferably the aliphatic alcohol (c1) having 1 to 9 carbon atoms.

Note that as the aliphatic alcohol (c1) having 1 to 9 carbon atoms, a polyvalent aliphatic alcohol having 1 to 9 carbon atoms is preferable.

Further, in the cross-linkable nitrile rubber composition of the present invention, as the compound (C), two or more types of the aliphatic alcohol (c1) having 1 to 9 carbon atoms are preferably contained.

The cross-linkable nitrile rubber composition of the present invention preferably further comprises a basic cross-linking accelerator having a cyclic amidine structure.

Alternatively, the cross-linkable nitrile rubber composition of the present invention preferably further comprises a basic cross-linking accelerator represented by the following general formula (1):

$$R^1\text{---}NH\text{---}R^2 \qquad (1)$$

where, in the general formula (1), $R^1$ and $R^2$ respectively independently are substituted or unsubstituted alkyl group having 1 to 12 carbon atoms, or substituted or unsubstituted cycloalkyl group having 5 to 12 carbon atoms.

Further, according to the present invention, a cross-linked rubber obtained by cross-linking the above cross-linkable nitrile rubber composition is provided. The cross-linked rubber of the present invention is preferably a seal member.

Effects of Invention

According to the present invention, a cross-linkable nitrile rubber composition excellent in processability and scorch stability and able to give cross-linked rubber excellent in compression set resistance and cross-linked rubber obtained using the cross-linkable nitrile rubber composition can be provided.

DESCRIPTION OF EMBODIMENTS

Cross-Linkable Nitrile Rubber Composition

The cross-linkable nitrile rubber composition of the present invention comprises a carboxyl group-containing nitrile rubber (A) with an iodine value of 120 or less, polyamine cross-linking agent (B), and at least one compound (C) selected from an aliphatic alcohol (c1) having 1 to 9 carbon atoms, hydroxyl group-containing aromatic compound (c2), and nitrogen-containing heterocyclic compound (c3).

Carboxyl Group-Containing Nitrile Rubber (A)

First, the carboxyl group-containing nitrile rubber (A) with an iodine value of 120 or less which is used in the present invention will be explained. The carboxyl group-containing nitrile rubber (A) with an iodine value of 120 or less which is used in the present invention (below, sometimes simply referred to as a "carboxyl group-containing nitrile rubber (A)") is rubber with an iodine value of 120 or less which was obtained by copolymerization of an α,β-ethylenically unsaturated nitrile monomer, carboxyl group-containing monomer, and, used in accordance with need, a conjugated diene monomer, α,β-ethylenically unsaturated monocarboxylic acid ester monomer, etc.

The α,β-ethylenically unsaturated nitrile monomer is not particularly limited so long as an α,β-ethylenically unsaturated compound which has a nitrile group. For example, acrylonitrile; α-chloroacrylonitrile, α-bromoacrylonitrile, or other α-halogenoacrylonitrile; methacrylonitrile or other α-alkylacrylonitrile; etc. may be mentioned. Among these as well, acrylonitrile and methacrylonitrile are preferable, while acrylonitrile is more preferable. The α,β-ethylenically unsaturated nitrile monomer may be used as a single type alone or a plurality of types combined.

The content of the α,β-ethylenically unsaturated nitrile monomer units is preferably 10 to 60 wt % with respect to the total monomer units, more preferably 10 to 50 wt %, furthermore preferably 15 to 50 wt %. If the content of the α,β-ethylenically unsaturated nitrile monomer units is too small, the obtained cross-linked rubber is liable to fall in oil resistance, while if too large, the cold resistance may fall.

The carboxyl group-containing monomer is not particularly limited so long as a monomer which can copolymerize with an α,β-ethylenically unsaturated nitrile monomer and having at least one unsubstituted (free) carboxyl group which is not esterified etc. By using a carboxyl group-containing monomer, it is possible to introduce carboxyl groups into the nitrile rubber.

As the carboxyl group-containing monomer used in the present invention, for example, an α,β-ethylenically unsaturated monocarboxylic acid monomer, α,β-ethylenically unsaturated polyvalent carboxylic acid monomer, α,β-ethylenically unsaturated dicarboxylic acid monoester monomer, etc. may be mentioned. Further, the carboxyl group-containing monomer also includes a monomer in which the carboxyl group of the monomer forms carboxylate. Furthermore, an anhydride of an α,β-ethylenically unsaturated polyvalent carboxylic acid also causes the acid anhydride group to cleave apart after copolymerization to form carboxyl group, so can be used as a carboxyl group-containing monomer.

As the α,β-ethylenically unsaturated monocarboxylic acid monomer, acrylic acid, methacrylic acid, ethylacrylic acid, crotonic acid, cinnamic acid, etc. may be mentioned.

As the α,β-ethylenically unsaturated polyvalent carboxylic acid monomer, fumaric acid, maleic acid and other butenedioic acid, itaconic acid, citraconic acid, mesaconic acid, glutaconic acid, allylmalonic acid, teraconic acid, etc. may be mentioned. Further, as the anhydride of an α,β-unsaturated polyvalent carboxylic acid, maleic anhydride, itaconic anhydride, citraconic anhydride, etc. may be mentioned.

As the α,β-ethylenically unsaturated dicarboxylic acid monoester monomer, a maleic acid monoalkyl ester such as monomethyl maleate, monoethyl maleate, monopropyl maleate, and mono n-butyl maleate; a maleic acid monocycloalkyl ester such as monocyclopentyl maleate, monocyclohexyl maleate, and monocycloheptyl maleate; a maleic acid monoalkylcycloalkyl ester such as monomethylcyclopentyl maleate, and monoethylcyclohexyl maleate; a fumaric acid monoalkyl ester such as monomethyl fumarate, monoethyl fumarate, monopropyl fumarate, and mono n-butyl fumarate; a fumaric acid monocycloalkyl ester such as monocyclopentyl fumarate, monocyclohexyl fumarate, and monocycloheptyl fumarate; a fumaric acid monoalkylcycloalkyl ester such as monomethylcyclopentyl fumarate, and monoethylcyclohexyl fumarate; a citraconic acid monoalkyl ester such as monomethyl citraconate, monoethyl citraconate, monopropyl citraconate, and mono n-butyl citraconate; a citraconic acid monocycloalkyl ester such as monocyclopentyl citraconate, monocyclohexyl citraconate, and monocycloheptyl citraconate; a citraconic acid monoalkylcycloalkyl ester such as monomethylcyclopentyl citraconate, and monoethylcyclohexyl citraconate; an itaconic acid monoalkyl ester such as monomethyl itaconate, monoethyl itaconate, monopropyl itaconate, and mono n-butyl itaconate; itaconic acid monocycloalkyl ester such as monocyclopentyl itaconate, monocyclohexyl itaconate, and monocycloheptyl itaconate; an itaconic acid monoalkylcycloalkyl ester such as monomethylcyclopentyl itaconate, and monoethylcyclohexyl itaconate; etc. may be mentioned.

The carboxyl group-containing monomer may be used as a single type alone or a plurality of types combined. Among these as well, since the effect of the present invention becomes further remarkable, an α,β-ethylenically unsaturated dicarboxylic acid monoester monomer is preferable, an α,β-ethylenically unsaturated dicarboxylic acid monoalkyl ester monomer is more preferable, a maleic acid monoalkyl ester is furthermore preferable, and mono-n-butyl maleate is particularly preferable. Note that, the number of carbon atoms of the alkyl group of the alkyl ester is preferably 2 to 8.

The content of the carboxyl group-containing monomer units is preferably 0.1 to 20 wt % with respect to the total monomer units, more preferably 0.2 to 15 wt %, furthermore preferably 0.5 to 10 wt %. If the content of the carboxyl group-containing monomer units is too small, the obtained cross-linked rubber is liable to fall in compression set resistance. On the other hand, if too great, the rubber composition is liable to fall in scorch stability and the obtained cross-linked rubber is liable to fall in fatigue resistance.

Further, the carboxyl group-containing nitrile rubber (A) used in the present invention preferably also contains conjugated diene monomer units so that the obtained cross-linked product has rubbery elasticity.

As the conjugated diene monomer which forms the conjugated diene monomer units, conjugated diene monomers having 4 to 6 carbon atoms such as 1,3-butadiene, isoprene, 2,3-dimethyl-1,3-butadiene, 1,3-pentadiene, and chloroprene are preferable, 1,3-butadiene and isoprene are more preferable, and 1,3-butadiene is particularly preferable. The conjugated diene monomer may be used as a single type alone or a plurality of types combined.

The content of the conjugated diene monomer units (including also hydrogenated parts) is preferably 20 to 89.9 wt % with respect to the total monomer units, more preferably 30 to 89.8 wt %, furthermore preferably 30 to 74.5 wt %. If the content of the conjugated diene monomer units is too small, the obtained cross-linked rubber is liable to fall in rubbery elasticity, while conversely if too great, it may be impaired in heat resistance or chemical resistance stability.

Further, the carboxyl group-containing nitrile rubber (A) used in the present invention may contain, in addition to the above-mentioned α,β-ethylenically unsaturated nitrile monomer units, carboxyl group-containing monomer units, and conjugated diene monomer units, further α,β-ethylenically unsaturated monocarboxylic acid ester monomer units.

As the α,β-ethylenically unsaturated monocarboxylic acid ester monomer which forms the α,β-ethylenically unsaturated monocarboxylic acid ester monomer units, a (meth)acrylic acid ester (abbreviation of "methacrylic acid ester and acrylic acid ester", same below) which has an alkyl group with 1 to 18 carbon atoms such as methyl acrylate, ethyl acrylate, n-butyl acrylate, isobutyl acrylate, n-dodecyl acrylate, methyl methacrylate, ethyl methacrylate; a (meth)acrylic acid ester which has an alkoxyalkyl group with 2 to 12 carbon atoms such as methoxymethyl acrylate, ethoxypropyl acrylate, methoxybutyl acrylate, ethoxydodecyl acrylate, methoxyethyl methacrylate, methoxybutyl methacrylate, and ethoxypentyl methacrylate; (meth)acrylic acid ester which has a cyanoalkyl group with 2 to 12 carbon atoms such as α-cyanoethyl acrylate, α-cyanoethyl methacrylate, and cyanobutyl methacrylate; a (meth)acrylic acid ester which has a hydroxyalkyl group with 1 to 12 carbon atoms such as 2-hydroxyethyl acrylate, 2-hydroxypropyl acrylate, and 2-hydroxyethyl methacrylate; a (meth)acrylic acid ester which has a fluoroalkyl group with 1 to 12 carbon atoms such as trifluoroethyl acrylate, and tetrafluoropropyl methacrylate; etc. may be mentioned, but from the viewpoint of improvement of the cold resistance and compression set resistance, (meth)acrylic acid ester which has an alkyl group with 1 to 18 carbon atoms and (meth)acrylic acid ester which has an alkoxyalkyl group with 2 to 18 carbon atoms are preferable, (meth)acrylic acid ester which has an alkyl group with 1 to 10 carbon atoms and (meth)acrylic acid ester which has an alkoxyalkyl group with 2 to 10 carbon atoms are more preferable, and n-butyl acrylate and methoxyethyl acrylate are particularly preferable. These may be used as single type alones or a plurality of types combined.

The content of the α,β-ethylenically unsaturated monocarboxylic acid ester monomer units is preferably 0 to 60 wt % with respect to the total monomer units, more preferably 0 to 50 wt %, furthermore preferably 0 to 45 wt %, particularly preferably 10 to 45 wt %.

Further, the carboxyl group-containing nitrile rubber (A) used in the present invention may be one obtained by copolymerizing together with a α,β-ethylenically unsaturated nitrile monomer, carboxyl group-containing monomer, α,β-ethylenically unsaturated monocarboxylic acid ester monomer, and conjugated diene monomer, other monomers which can be copolymerized with these. As such other monomers, ethylene, α-olefin monomer, aromatic vinyl monomer, fluorine-containing vinyl monomer, etc. may be illustrated.

As the α-olefin monomer, one with 3 to 12 carbon atoms is preferable, for example, propylene, 1-butene, 4-methyl-1-pentene, 1-hexene, 1-octene, etc. may be mentioned.

As the aromatic vinyl monomer, for example, styrene, α-methylstyrene, vinyl pyridine, etc. may be mentioned.

As the fluorine-containing vinyl monomer, for example, fluoroethylvinyl ether, fluoropropylvinyl ether, o-trifluoromethylstyrene, vinyl pentafluorobenzoate, difluoroethylene, tetrafluoroethylene, etc. may be mentioned.

The copolymerizable other monomer may be a plurality of types jointly used. The content of the units of the other monomer is preferably 50 wt % or less with respect to the total monomer units, more preferably 30 wt % or less, still more preferably 10 wt % or less.

The carboxyl group-containing nitrile rubber (A) has an iodine value of 120 or less, preferably 60 or less, more preferably 40 or less, particularly preferably 30 or less. If the iodine value of the carboxyl group-containing nitrile rubber (A) is too high, the obtained cross-linked product is liable to fall in heat resistance and ozone resistance.

The carboxyl group-containing nitrile rubber (A) has a polymer Mooney viscosity ($ML_{1+4}$, 100° C.) of preferably 10 to 200, more preferably 15 to 150, furthermore preferably 15 to 100, particularly preferably 30 to 70. If the polymer Mooney viscosity of the carboxyl group-containing nitrile rubber (A) is too low, the obtained cross-linked rubber is liable to fall in mechanical properties, while conversely if too high, the cross-linkable rubber composition may fall in processability.

Further, in the carboxyl group-containing nitrile rubber (A), the content of the carboxyl groups, that is, the number of moles of the carboxyl group per 100 g of the carboxyl group-containing nitrile rubber (A), is preferably $5\times10^{-4}$ to $5\times10^{-1}$ ephr, more preferably $1\times10^{-3}$ to $1\times10^{-1}$ ephr, particularly preferably $5\times10^{-3}$ to $6\times10^{-2}$ ephr. If the carboxyl group-containing nitrile rubber (A) is too small in content of carboxyl groups, the obtained cross-linked product is liable to fall in mechanical strength, while if too large, the cold resistance may fall.

The method of production of the carboxyl group-containing nitrile rubber (A) of the present invention is not particularly limited, but it is preferable to use emulsion polymerization using an emulsifying agent to copolymerize the above monomers to prepare a latex of copolymer rubber and hydrogenate this. At the time of emulsion polymerization, an emulsifying agent, polymerization initiator, molecular weight adjuster, or other usually used secondary polymerization material may be used.

The emulsifier is not particularly limited, but, for example, a nonionic emulsifier such as a polyoxyethylene alkyl ether, and polyoxyethylene alkyl ester; an anionic emulsifier such as a salt of a fatty acid such as myristic acid, palmitic acid, oleic acid, and linoleic acid, an alkylbenzene sulfonic acid salt such as sodium dodecylbenzene sulfonate, a higher alcohol sulfuric acid ester salt, and an alkyl sulfosuccinic acid salt; a copolymerizable emulsifier such as a sulfo ester of an α,β-unsaturated carboxylic acid, a sulfate ester of an α,β-unsaturated carboxylic acid, and a sulfoalkylaryl ether; etc. may be mentioned. The use amount of the emulsifier is preferably 0.1 to 10 parts by weight with respect to 100 parts by weight of the total monomers.

The polymerization initiator is not particularly limited if a radical initiator, but an inorganic peroxide such as potassium persulfate, sodium persulfate, ammonium persulfate, potassium perphosphate, and hydrogen peroxide; an organic peroxide such as t-butyl peroxide, cumen hydroperoxide, p-mentane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butyl peroxyisobutyrates; an azo compound such as azobisisobutyronitrile, azobis-2,4-dimethyl valeronitrile, azobiscyclohexane carbonitrile, and methyl azobisisobutyrate. The polymerization initiator may be used alone or as two types or more combined. As the polymerization initiator, an inorganic or organic peroxide is preferable. When using the peroxide as the polymerization initiator, it may be combined with sodium hydrogen sulfite, ferrous sulfate, and other reducing agents for use as a redox-based polymerization initiator. The amount of use of the polymerization initiator is preferably 0.01 to 2 parts by weight with respect to 100 parts by weight of the total monomers.

The molecular weight adjuster is not particularly limited, but a mercaptan such as t-dodecyl mercaptan, n-dodecyl mercaptan, and octyl mercaptan; a halogenated hydrocarbon such as carbon tetrachloride, methylene chloride, and methylene bromide; an α-methylstyrene dimer; a sulfur-containing compound such as tetraethyl thiuram disulfide, dipentamethylene thiuram disulfide, and diisopropyl xantogen disulfide; etc. may be mentioned. These can be used alone or as two or more types combined. Among these as well, a mercaptan is preferable, while t-dodecyl mercaptan is more preferable. The use amount of the molecular weight adjuster is preferably 0.1 to 2 parts by weight with respect to 100 parts by weight of the total monomers.

For the medium of the emulsion polymerization, usually water is used. The amount of water is preferably 80 to 500 parts by weight with respect to 100 parts by weight of the total monomers.

At the time of emulsion polymerization, further, in accordance with need, a polymerization secondary material such as a stabilizer, dispersant, pH adjuster, deoxidant, and particle size adjuster may be used. When using these, the type and use amount are not particularly limited.

Further, by selectively hydrogenating the double bonds of the conjugated diene monomer units of the obtained copolymer, it is possible to produce a carboxyl group-containing nitrile rubber (A). Note that, the type and amount of the hydrogenation catalyst which is used for the hydrogenation, the hydrogenation temperature, etc. may be determined based on known methods.

Polyamine Cross-Linking Agent (B)

The cross-linkable nitrile rubber composition of the present invention contains a polyamine cross-linking agent (B). By using a cross-linking agent constituted by the polyamine cross-linking agent (B), the obtained cross-linked rubber is improved in compression set resistance.

The polyamine cross-linking agent (B) used in the present invention is not particularly limited so long as a compound having two or more amino groups or a compound of a form having two or more amino groups at the time of cross-linking, but a compound of an aliphatic hydrocarbon or aromatic hydrocarbon with its plurality of hydrogen atoms substituted by amino groups or hydrazide structures (structures expressed by —CONHNH$_2$, where CO indicates a carbonyl group) and a compound becoming the form of such a compound at the time of cross-linking are preferable. As specific examples, an aliphatic polyvalent amine such as hexamethylenediamine, hexamethylenediamine carbamate, dodecamethylenediamine, tetramethylenepentamine, hexamethylenediamine-cinnamaldehyde adduct, hexamethylenediamine dibenzoate salt; an aromatic polyvalent amine such as 2,2-bis{4-(4-aminophenoxy)phenyl}propane, 4,4'-methylenedianiline, m-phenylenediamine, p-phenylenediamine, and 4,4'-methylenebis(o-chloroaniline); a compound which has two or more hydrazide structures such as dihydrazide isophthalate, dihydrazide adipate, and dihydrazide sebacate; etc. may be mentioned. Among these as well, dodecamethylenediamine and hexamethylenediamine carbamate are preferable, while hexamethylenediamine carbamate is particularly preferable.

In the cross-linkable nitrile rubber composition of the present invention, the amount of the polyamine cross-linking agent (B) is preferably 0.1 to 20 parts by weight with respect to 100 parts by weight of the carboxyl group-containing nitrile rubber (A), more preferably 0.2 to 15 parts by weight, furthermore preferably 0.5 to 10 parts by weight. If the amount of the polyamine cross-linking agent (B) is too small, the obtained cross-linked rubber is liable to deteriorate in mechanical properties and compression set resistance. On the other hand, if too large, the obtained cross-linked rubber tends to deteriorate in fatigue resistance.

Compound (C)

The cross-linkable nitrile rubber composition of the present invention contains, in addition to the carboxyl group-containing nitrile rubber (A) and polyamine cross-linking agent (B), at least one compound (C) selected from an aliphatic alcohol (c1) having 1 to 9 carbon atoms, hydroxyl group-containing aromatic compound (c2), and nitrogen-containing heterocyclic compound (c3).

In the present invention, by blending such a compound (C) together with a polyamine cross-linking agent (B) in the carboxyl group-containing nitrile rubber (A), it is possible to improve the processability and scorch stability when made into a rubber composition and furthermore possible to make the obtained cross-linked rubber excellent in compression set resistance. Note that, as such a reason, for example, such a compound (C) may act as a protective group of the carboxyl group forming the cross-linking points of the carboxyl group-containing nitrile rubber (A).

The aliphatic alcohol (c1) having 1 to 9 carbon atoms is not particularly limited, but may be any of a monovalent aliphatic alcohol (c1) having 1 to 9 carbon atoms or a polyvalent aliphatic alcohol (c1) having 1 to 9 carbon atoms.

As the monovalent aliphatic alcohol (c1) having 1 to 9 carbon atoms, for example, methanol, ethanol, 1-propanol, 2-propanol, n-butyl alcohol, sec-butyl alcohol, t-butyl alcohol, n-pentyl alcohol, hexyl alcohol, heptyl alcohol, octyl alcohol, nonyl alcohol, allyl alcohol, propargyl alcohol, methallyl alcohol, 2-butyn-1-ol, 3-butyn-1-ol, 2-buten-1-ol, etc. may be mentioned.

As the polyvalent aliphatic alcohol (c1) having 1 to 9 carbon atoms, for example, divalent linear or branched aliphatic alcohols such as ethyleneglycol, 1,2-propanediol, diethyleneglycol, dipropyleneglycol, triethyleneglycol, neopentylglycol, 1,6-hexanediol, 3-methyl-1,5-pentanediol, 1,8-octanediol, and 1,9-nonanediol; divalent cyclic aliphatic alcohols such as cyclopentane-1,2-diol, cyclohexane-1,2-diol, cyclohexane-1,3-diol, cyclohexane-1,4-diol, cyclooctane-1,4-diol, and 2,5-norbornanediol; trivalent or higher aliphatic alcohols such as trimethylolpropane, glycerin, and pentaerythritol; etc. may be mentioned.

Further, the hydroxyl group-containing aromatic compound (c2) is not particularly limited so long as an aromatic compound having a hydroxyl group, but a compound having a phenolic hydroxyl group is preferable. As the compound having a phenolic hydroxyl group, a compound having one phenolic hydroxyl group such as phenol, 4-methoxyphenol, 4-phenoxyphenol, 3,5-di-t-butyl-4-hydroxytoluene, 2-t-butyl-4-methoxyphenol, 2,6-di-t-butyl-4-ethylphenol, tocopherol, and 4-t-butylphenol; a compound having two phenolic hydroxyl groups such as hydroquinone, 2-t-butylhydroquinone, and 4-t-butylcatechol; etc. may be mentioned.

Furthermore, as the nitrogen-containing heterocyclic compound (c3), a five-member nitrogen-containing heterocyclic compound such as imidazole, 1-methylimidazole, 1-ethylimidazole, 1,2-dimethylimidazole, 1,4-dimethylimidazole, 1,5-dimethylimidazole, 1,2,4-trimethylimidazole, 1-ethyl-2-methylimidazole, 1,4-dimethyl-2-ethylimidazole, 1-methoxyethylimidazole, 1-methyl-2-methoxyimidazole, 1-methyl-2-ethoxyimidazole, 1-methyl-4-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylimidazoline, 1,2-dimethylimidazoline, 1,2,4-trimethylimidazoline, 1,4-dimethyl-2-ethylimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, pyrrole, methylpyrrole, thiazole, oxazole, pyrazole, and isooxazole; a six-member nitrogen-containing heterocyclic compound such as pyridine, pyradine, pyrimidine, pyridazine, triazine, and 2,6-lutidine; a condensed nitrogen-containing heterocyclic compound such as quinoline, isoquinoline, quinoxaline, quinazoline, cinnoline, purine, indole, isoindole, benzoimidazole, benzooxazole, and benzisoxazole; etc. may be mentioned.

In the present invention, as the compound (C), due to the effect of addition, in particular the high effect of improvement of the scorch stability, the aliphatic alcohol (c1) having 1 to 9 carbon atoms is preferable, the polyvalent aliphatic alcohol having 1 to 9 carbon atoms is more preferable, a polyvalent aliphatic alcohol having 2 to 9 carbon atoms is furthermore preferable, a polyvalent aliphatic alcohol having 2 to 6 carbon atoms is even more preferable, a linear polyvalent aliphatic alcohol having 2 to 6 carbon atoms is particularly preferable, while ethyleneglycol, 1,2-propanediol, diethyleneglycol, and glycerin are most preferable.

Further, when using the polyvalent aliphatic alcohol having 1 to 9 carbon atoms as the compound (C), from the viewpoint of further improving the effect of improvement of the scorch stability, two or more types of the polyvalent aliphatic alcohols having 1 to 9 carbon atoms are preferably contained (jointly used), while the divalent aliphatic alcohol and the trivalent or higher aliphatic alcohol are particularly preferably contained (jointly used). Note that, at this time, the ratio of the divalent aliphatic alcohol and the trivalent or higher aliphatic alcohol is a weight ratio of the "divalent aliphatic alcohol:trivalent or higher aliphatic alcohol" of preferably 1:10 to 10:1 in range, more preferably 3:7 to 7:3 in range.

In the cross-linkable nitrile rubber composition of the present invention, the amount of the compound (C) is preferably 0.1 to 20 parts by weight with respect to 100 parts by weight of the carboxyl group-containing nitrile rubber (A), more preferably 0.5 to 15 parts by weight, furthermore preferably 1 to 12 parts by weight, particularly preferably 1 to 8 parts by weight. If the amount of the compound (C) is too small, the effect of improvement of the processability and scorch stability is liable to become harder to obtain, while if too large, the compression set resistance is liable to fall.

Basic Cross-Linking Accelerator

Further, the cross-linkable nitrile rubber composition of the present invention preferably contains a basic cross-linking accelerator, in addition to the above carboxyl group-containing nitrile rubber (A), polyamine cross-linking agent (B), and compound (C). By further being made to contain a basic cross-linking accelerator, the effects of the present invention become much more remarkable.

As specific examples of the basic cross-linking accelerator, a compound represented by the following general formula (1), a basic cross-linking accelerator having a cyclic amidine structure, a guanidine-based basic cross-linking accelerator, an aldehyde amine-based basic cross-linking accelerator, etc. may be mentioned.

(Where in the general formula (1), $R^1$ and $R^2$ respectively independently are substituted or unsubstituted alkyl group having 1 to 12 carbon atoms or substituted or unsubstituted cycloalkyl group having 5 to 12 carbon atoms.)

$R^1$ and $R^2$ are substituted or unsubstituted alkyl group having 1 to 12 carbon atoms or substituted or unsubstituted cycloalkyl group having 5 to 12 carbon atoms, but substituted or unsubstituted cycloalkyl group having 5 to 12 carbon atoms are preferable, while substituted or unsubstituted cycloalkyl group having 5 to 8 carbon atoms are particularly preferable.

Further, $R^1$ and $R^2$ are preferably one not having a substituent.

Note that, as special examples of a substituent in the case where $R^1$ and $R^2$ are one having a substituent, a hydroxyl group, alkoxy group, alkoxycarbonyl group, amino group, halogen atom, etc. may be mentioned.

Further, among these compounds represented by the above general formula (1), from the viewpoint of further raising the processability and scorch stability, a compound of the following general formula (2) is more preferable.

(Where in the general formula (2), $R^3$ and $R^4$ respectively independently are substituted or unsubstituted cycloalkyl group having 5 to 8 carbon atoms.)

$R^3$ and $R^4$ are substituted or unsubstituted cycloalkyl group having 5 to 8 carbon atoms, but a substituted or unsubstituted cycloalkyl group having 5 to 6 carbon atoms is preferable, while a substituted or unsubstituted cycloalkyl group having 6 carbon atoms is more preferable.

Further, $R^3$ and $R^4$ are preferably one not having a substituent.

Note that, as specific examples of a substituent when $R^3$ and $R^4$ are one having a substituent, a hydroxyl group, alkoxy group, alkoxycarbonyl group, amino group, halogen atom, etc. may be mentioned.

As specific examples of the compound represented by the above general formula (1), a dicycloalkylamine such as dicyclopentylamine, dicyclohexylamine, and dicycloheptylamine; a secondary amine where an alkyl group and a cycloalkyl group are bonded to a nitrogen atom such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, and N-octylcyclooctylamine; a secondary amine where an alkyl group having a hydroxy group and a cycloalkyl group are bonded to a nitrogen atom such as N-hydroxymethylcyclopentylamine, and N-hydroxybutylcyclohexylamine; a secondary amine where an alkyl group having an alkoxy group and a cycloalkyl group are bonded to a nitrogen atom such as N-methoxyethylcyclopentylamine and N-ethoxybutylcyclohexylamine; a secondary amine where an alkyl group having an alkoxycarbonyl group and a cycloalkyl group are bonded to a nitrogen atom such as N-methoxycarbonylbutylcyclopentylamine and N-methoxycarbonyheptylcyclohexylamine; a secondary amine where an alkyl group having an amino group and a cycloalkyl group are bonded to a nitrogen atom such as N-aminopropylcyclopentylamine and N-aminoheptylcyclohexylamine; a secondary amine where a cycloalkyl group having a halogen atom are bonded to a nitrogen atom such as di(2-chlorocyclopentyl)amine and di(3-chlorocyclopentyl)amine; etc. may be mentioned. From the viewpoint of further raising the processability and scorch stability, a dicycloalkylamine is preferable, a dicyclopentylamine and dicyclohexylamine are more preferable, and a dicyclohexylamine is particularly preferable.

Further, as the compound represented by the above general formula (1), for example, one forming a salt with a divalent alcohol etc. may be used. In this case, separate from the polyvalent aliphatic alcohol having 1 to 9 carbon atoms forming the above-mentioned compound (C), one in a state forming a salt with the compound represented by the above general formula (1) in advance is preferably used.

Further, as a basic cross-linking accelerator having a cyclic amidine structure, 1,8-diazabicyclo[5,4,0]undecene-7 (below, sometimes abbreviated as "DBU") and 1,5-diazabicyclo[4,3,0]nonene-5 (below, sometimes abbreviated as "DBN"), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl) imidazole, 1-methylbenzoimidazole, 1-methyl-2-benzylbenzoimidazole, 1-methyl-5-nitrobenzoimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, 1-ethoxymethyl-2-methylimidazoline, etc. may be mentioned. Among these basic cross-linking accelerator having a cyclic amidine structure as well, 1,8-diazabicyclo[5,4,0]undecene-7 and 1,5-diazabicyclo[4,3,0]nonene-5 are preferable, while 1,8-diazabicyclo[5,4,0]undecene-7 is more preferable.

As a guanidine-based basic cross-linking accelerator, tetramethylguanidine, tetraethylguanidine, diphenylguanidine, 1,3-di-o-tolylguanidine, o-tolylbiguanide, etc. may be mentioned.

As the aldehyde amine-based basic cross-linking accelerator, n-butylaldehyde aniline, acetoaldehyde ammonia, etc. may be mentioned.

Among these basic cross-linking accelerators as well, a compound represented by the above general formula (1), a guanidine-based basic cross-linking accelerator, and a basic cross-linking accelerator having a cyclic amidine structure are preferable, while a compound represented by the above general formula (1) and a basic cross-linking accelerator having a cyclic amidine structure are more preferable.

When mixing in a basic cross-linking accelerator, the amount in the cross-linkable nitrile rubber composition of the present invention is preferably 0.1 to 20 parts by weight with respect to 100 parts by weight of the carboxyl group-containing nitrile rubber (A), more preferably 0.2 to 15 parts by weight, furthermore preferably 0.5 to 10 parts by weight, particularly preferably 1 to 10 parts by weight. If the amount of basic cross-linking accelerator is too small, sometimes the cross-linkable nitrile rubber composition becomes too slow in cross-linking speed and the cross-linking density falls. On the other hand, if the amount is too large, the cross-linkable nitrile rubber composition is sometimes impaired in storage stability.

Further, the cross-linkable nitrile rubber composition of the present invention may have blended into it, in addition to the above ingredients, compounding agents which are usually used in the field of rubber, for example, a cross-linking accelerator other than a basic cross-linking accelerator, cross-linking aid, cross-linking retardant, antiaging agent, antioxidant, photostabilizer, plasticizer, processing aid, slip agent, tackifier, lubricant, flame retardant, antifungal agent, acid accept agent, antistatic agent, pigment, carbon black, silica, etc. The amounts of these compounding agents are not particularly limited so long as in the range not detracting from the effects of the present invention. Amounts according to the purposes of inclusion may be suitably employed.

The cross-linkable nitrile rubber composition of the present invention may contain rubber other than the above carboxyl group-containing nitrile rubber (A) in a range where the effects of the present invention are not impaired.

As the other polymer, acrylic rubber, ethylene-acrylate copolymer rubber, fluororubber, styrene-butadiene copolymer rubber, ethylene-propylene copolymer rubber, ethylene-propylene-diene ternary copolymer rubber, natural rubber, polyisoprene rubber, etc. may be mentioned. When mixing in the other polymer, the amount in the cross-linkable nitrile rubber composition is preferably 30 parts by weight or less with respect to 100 parts by weight of the carboxyl group-containing nitrile rubber (A), more preferably 20 parts by weight or less, furthermore preferably 10 parts by weight or less.

The cross-linkable nitrile rubber composition of the present invention is preferably prepared by mixing the above ingredients in nonaqueous systems. The method of preparing the cross-linkable nitrile rubber composition of the present invention is not limited, but usually ingredients other than the polyamine cross-linking agent (B) and thermally unstable cross-linking aid etc. are processed by primary kneading by a mixer such as a Bambury mixer, internal mixer, or kneader, then are transferred to rolls etc. where the polyamine cross-linking agent (B) and thermally unstable cross-linking aid etc. are added and secondary kneading performed.

Note that, when kneading these by a mixer, various types of compounding agents such carbon black, silica, and an antiaging agent or other rubber may be simultaneously mixed.

The thus obtained cross-linkable nitrile rubber composition of the present invention has a compound Mooney viscosity [$ML_{1+4}$, 100° C.] of preferably 10 to 150, more preferably 20 to 130, furthermore preferably 30 to 120 and is excellent in processability. Furthermore, the cross-linkable nitrile rubber composition of the present invention is also excellent in scorch stability.

Cross-Linked Rubber

The cross-linked rubber of the present invention is obtained by cross-linking the above-mentioned cross-linkable nitrile rubber composition of the present invention.

The cross-linked rubber of the present invention may be produced by using the cross-linkable nitrile rubber composition of the present invention, shaping it by using, for example, a molding machine corresponding to the desired shape such as an extruder, injection molding machine, compressor, roll, etc., heating it to perform a cross-linking reaction, and fixing the shape as a cross-linked product. In this case, it is possible to perform the cross-linking after the preliminary shaping or perform the cross-linking simultaneously with the shaping. The shaping temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 1 hour.

Further, depending on the shape, size, etc. of the cross-linked rubber, sometimes even if the surface is cross-linked, the inside will not be sufficiently cross-linked, so the rubber may be further heated for secondary cross-linking.

As the heating method, a general method which is used for cross-linking rubber such as press heating, steam heating, oven heating, and hot air heating may be suitably selected.

The thus obtained cross-linked rubber of the present invention is excellent in compression set resistance in addition to the properties inherent to nitrile rubber which is excellent in oil resistance, mechanical properties, etc.

For this reason, the cross-linked rubber of the present invention can be used for O-rings, packings, diaphragms, oil seals, shaft seals, bearing seals, well head seals, air compressor seals, seals for sealing in Freon or fluorohydrocarbons or carbon dioxide which is used for compressors for cooling devices for air conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), bladders, and other various seal members; intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, top cover use gaskets for hard disk drives, and other various types of gaskets; printing use rolls, ironmaking use rolls, papermaking use rolls, industrial use rolls, office equipment use rolls, and other various types of rolls; flat belts (film core flat belts, cogged flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, cogged V-ribbed belts, etc.), CVT use belts, timing belts, toothed belt, conveyor belts, oil immersed belts, and other various types of belts; fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, flow lines, and other various types of hoses; CVJ boots, propeller shaft boots, constant velocity joint boots, rack and pinion boots, and other various types of boots; cushion materials, dynamic dampers, rubber couplings, air springs, shock absorbers, and other attenuating member rubber parts; dust covers, automotive interior members, tires, covered cables, shoe soles, electromagnetic wave shields, binders for flexible printed circuits boards or other binders, fuel cell separators and also other broad applications in the fields of cosmetics and pharmaceuticals, fields in contact with food, the electronics field, etc.

Among these as well, the cross-linked rubber of the present invention can be suitably used for seal members, gaskets, belts, or hoses and can be particularly suitably used for seal members.

EXAMPLES

Below, examples and comparative examples will be given to explain the present invention in more detail. Below, unless otherwise indicated, "parts" are based on weight. Note that the tests and evaluations wee based on the following.

Iodine Value

The iodine value of the carboxyl group-containing nitrile rubber was measured based on JIS K 6235.

Content of Carboxyl Groups

To 0.2 g of 2 mm square carboxyl group-containing nitrile rubber, 100 ml of 2-butanone was added and the mixture stirred for 16 hours, then 20 ml of ethanol and 10 ml of water were added and the mixture stirred. Using a 0.02N hydrous ethanol solution of potassium hydroxide, titration was performed at room temperature with thymol phthalein as an indicator so as to find the number of moles of carboxyl groups with respect to 100 g of rubber (units: ephr).

Composition of Nitrile Rubber

The ratios of contents of the monomer units forming the carboxyl group-containing nitrile rubber were measured by the following method.

That is, the ratio of content of the mono-n-butyl maleate units was calculated by using the method of measurement of the above "carboxyl-group content" so as to find the number of moles of the carboxyl group with respect to 100 g of the carboxyl group-containing nitrile rubber after hydrogenation and converting the number of moles which were found to the amount of mono-n-butyl maleate units.

The ratio of content of 1,3-butadiene units (including hydrogenated parts) was calculated by measuring the iodine value of the carboxyl group-containing nitrile rubber before the hydrogenation reaction by the above method.

The ratio of content of the acrylonitrile units was calculated by measuring the nitrogen content in the carboxyl group-containing nitrile rubber after hydrogenation by the Kjeldahl method in accordance with JIS K6384.

Mooney Viscosity

The Mooney viscosity of the carboxyl group-containing nitrile rubber and cross-linkable nitrile rubber composition (polymer Mooney and compound Mooney) were measured by JIS K6300 (units: [$ML_{1+4}$, 100° C.]).

Scorch Stability

The Mooney scorch time t35 of the cross-linkable nitrile rubber composition was measured in accordance with JIS K6300 at 125° C. t35 is the time where V rose 35 from the Vmin of the minimum value of the Mooney viscosity value. The larger the value of the Mooney scorch time t35, the better the scorch stability.

Compression Set (O-Ring Compression Set)

Using an outside diameter 30 mm and ring diameter 3 mm mold, a cross-linkable nitrile rubber composition was cross-linked at 170° C. for 20 minutes by a press pressure of 5 MPa, then was secondarily cross-linked at 170° C. for 4 hours to obtain an O-ring shaped test piece. Further, the obtained O-ring shaped test piece was used to measure the compression set (O-ring compression set) in accordance with JIS K6262 under conditions held at 150° C. for 168 hours in the state with the distance between two flat plates which sandwich the O-ring shaped test piece compressed 25% in the ring thickness direction. The smaller this value, the better the compression set resistance.

Synthesis Example 1 (Production of Carboxyl Group-Containing Highly Saturated Nitrile Rubber (A-1))

To a metal bottle, 180 parts of ion exchanged water, 25 parts of concentration 10 wt % sodium dodecylbenzene sulfonate aqueous solution, 37 parts of acrylonitrile, 6 parts of mono-n-butyl maleate, and 0.75 part of t-dodecyl mercaptan (molecular weight adjuster) were charged in that order. The inside gas was replaced with nitrogen 3 times, then 57 parts of 1,3-butadiene were charged. The metal bottle was held at 5° C., 0.1 part of cumen hydroperoxide (polymerization initiator) was charged, suitable amounts of a reducing agent and chelating agent were charged, then the metal bottle was made to rotate while continuing the polymerization reaction for 16 hours. Next, 0.1 part of concentration 10 wt % hydroquinone aqueous solution (polymerization terminator) was added to stop the polymerization reaction, then the content of the metal bottle was transferred to a glass flask, then a water temperature 60° C. rotary evaporator was used to remove the residual monomer and obtain a latex of acrylonitrile-butadiene-mono-n-butyl maleate copolymer rubber (solid content concentration approximately 30 wt %).

Next, to the above obtained latex, a palladium catalyst (solution of 1 wt % palladium acetate acetone solution and equal weight of ion exchanged water mixed together) was added in an autoclave to give an amount of palladium of 1000 ppm with respect to the weight of the rubber contained in the latex obtained above. The mixture was reacted by a hydrogenation reaction at a hydrogen pressure 3 MPa and temperature 50° C. for 6 hours to obtain a latex of a carboxyl group-containing highly saturated nitrile rubber (A-1). Further, to the obtained latex, two times the volume of methanol was added to coagulate it, then the result was filtered to take out the solids (crumbs). This was dried in vacuo at 60° C. for 12 hours to thereby obtain a carboxyl group-containing highly saturated nitrile rubber (A-1).

The obtained carboxyl group-containing highly saturated nitrile rubber (A-1) had an iodine value of 10, a carboxyl group content of $3.2 \times 10^{-2}$ ephr, and a polymer Mooney viscosity ($ML_{1+4}$, 100° C.) of 45. Further, the composition of the carboxyl group-containing highly saturated nitrile rubber (A-1) was acrylonitrile units: 36 wt %, butadiene units (including hydrogenated ones): 58.5 wt %, and mono-n-butyl maleate units: 5.5 wt %.

Example 1

Using a Bambury mixer, 100 parts of the carboxyl group-containing highly saturated nitrile rubber (A-1) obtained in Synthesis Example 1 were mixed with 40 parts of FEF carbon black (product name "Seast SO", made by Tokai Carbon), 5 parts of tri-2-ethylhexyl trimellitate (product name "ADK Cizer C-8", made by ADEKA, plasticizer), 1.5 parts of 4,4'-di-(α,α-dimethylbenzyl)diphenylamine (product name "Nocrac CD", made by Ouchi Shinko Chemical Industrial, antiaging agent), 1 part of stearic acid, 1 part of polyoxyethylene alkyl ether phosphoric acid ester (product name "Phosphanol RL210", made by TOHO Chemical Industry, processing aid), and 2.5 parts of 2-propanol (aliphatic alcohol (c1) having 1 to 9 carbon atoms) and the mixture mixed at 50° C. for 5 minutes. Next, the obtained mixture was transferred to 50° C. rolls where it was mixed with 2.4 parts of hexamethylene diamine carbamate (product name "Diak#1", made by Dupont-Dow Elastomer, polyamine cross-linking agent belonging to aliphatic polyvalent amines) and 4 parts of 1,8-diazabicyclo[5,4,0]-undecene-7 (DBU) (product name "RHENOGRAN XLA-60 (GE2014)", made by RheinChemie, DBU 60% (including part becoming zinc dialkyl diphosphate), basic cross-linking accelerator) and kneaded to obtain a cross-linkable nitrile rubber composition.

Further, the obtained cross-linkable nitrile rubber composition was used by the above method to measure the compound Mooney viscosity, Mooney scorch time t35, and compression set. The results are shown in Table 1.

Example 2

Except for using, instead of 2.5 parts of 2-propanol, 2.5 parts of 1,2-propanediol (aliphatic alcohol (c1) having 1 to 9 carbon atoms), the same procedure was followed as in Example 1 to prepare a cross-linkable nitrile rubber composition and the same procedure was followed to evaluate it. The results are shown in Table 1.

Example 3

Except for changing the amount of 1,2-propanediol from 2.5 parts to 5 parts, the same procedure was followed as in Example 2 to prepare a cross-linkable nitrile rubber composition and the same procedure was followed to evaluate it. The results are shown in Table 1.

Example 4

Except for using, instead of 2.5 parts of 2-propanol, 2.5 parts of glycerin (aliphatic alcohol (c1) having 1 to 9 carbon atoms), the same procedure was followed as in Example 1 to prepare a cross-linkable nitrile rubber composition and the same procedure was followed to evaluate it. The results are shown in Table 1.

Example 5

Except for changing the amount of glycerin from 2.5 parts to 5 parts, the same procedure was followed as in Example 4 to prepare a cross-linkable nitrile rubber composition and the same procedure was followed to evaluate it. The results are shown in Table 1.

Example 6

Except for using, instead of 2.5 parts of 2-propanol, 2.5 parts of ethyleneglycol (aliphatic alcohol (c1) having 1 to 9 carbon atoms), the same procedure was followed as in Example 1 to prepare a cross-linkable nitrile rubber composition and the same procedure was followed to evaluate it. The results are shown in Table 1.

Example 7

Except for using, instead of 2.5 parts of 2-propanol, 2.5 parts of diethyleneglycol (aliphatic alcohol (c1) having 1 to 9 carbon atoms), the same procedure was followed as in Example 1 to prepare a cross-linkable nitrile rubber composition and the same procedure was followed to evaluate it. The results are shown in Table 1.

Example 8

Except for using, instead of 2.5 parts of 2-propanol, 2.5 parts of 3,5-di-t-butyl-4-hydroxytoluene (hydroxyl group-containing aromatic compound (c2)), the same procedure was followed as in Example 1 to prepare a cross-linkable nitrile rubber composition and the same procedure was followed to evaluate it. The results are shown in Table 1.

Example 9

Except for using, instead of 2.5 parts of 2-propanol, 2.5 parts of imidazole (nitrogen-containing heterocyclic compound (c3)), the same procedure was followed as in Example 1 to prepare a cross-linkable nitrile rubber composition and the same procedure was followed to evaluate it. The results are shown in Table 1.

Comparative Example 1

Except for not adding 2.5 parts of 2-propanol, the same procedure was followed as in Example 1 to prepare a cross-linkable nitrile rubber composition and the same procedure was followed to evaluate it. The results are shown in Table 1.

Comparative Example 2

Except for using, instead of 2.5 parts of 2-propanol, 2.5 parts of n-stearyl alcohol, the same procedure was followed as in Example 1 to prepare a cross-linkable nitrile rubber composition and the same procedure was followed to evaluate it. The results are shown in Table 1.

accelerator, 4 parts of 1,8-diazabicyclo[5,4,0]-undecene-7 (DBU (product name "RHENOGRAN XLA-60 (GE2014)", made by RheinChemie, DBU 60% (including part becoming zinc dialkyl disphosphate salt)), 4 parts of a mixture of a dicyclohexylamine salt of ethyleneglycol and a long chain alcohol (product name "NOCMASTER EGS", made by Ouchi Shinko Chemical Industrial, comprised of dicyclohexylamine salt of ethyleneglycol 80% and long chain alcohol (1-tetradecanol, 1-hexadecanol, and 1-octadecanol) 20%), the same procedure was followed as in Example 1 to

TABLE 1

|   | | Example | | | | | | | | | Comparative Example | |
|---|---|---|---|---|---|---|---|---|---|---|---|---|
|   | | 1 | 2 | 3 | 4 | 5 | 6 | 7 | 8 | 9 | 1 | 2 |
| Formulation | | | | | | | | | | | | |
| Carboxyl group-containing nitrile rubber (A-1) | (parts) | 100 | 100 | 100 | 100 | 100 | 100 | 100 | 100 | 100 | 100 | 100 |
| FEF carbon black | (parts) | 40 | 40 | 40 | 40 | 40 | 40 | 40 | 40 | 40 | 40 | 40 |
| Tri-2-ethylhexyl trimellitate | (parts) | 5 | 5 | 5 | 5 | 5 | 5 | 5 | 5 | 5 | 5 | 5 |
| 4,4'-di-(α,α-dimethylbenzyl)diphenylamine | (parts) | 1.5 | 1.5 | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 | 1 | 1 |
| Polyoxyethylene alkyl ether phosphoric acid ester | (parts) | 1 | 1 | 1 | 1 | 1 | 1 | 1 | 1 | 1 | 1 | 1 |
| 2-propanol | (parts) | 2.5 | | | | | | | | | | |
| 1,2-propanediol | (parts) | | 2.5 | 5 | | | | | | | | |
| Glycerin | (parts) | | | | 2.5 | 5 | | | | | | |
| Ethyleneglycol | (parts) | | | | | | 2.5 | | | | | |
| Diethyleneglycol | (parts) | | | | | | | 2.5 | | | | |
| 3,5-di-t-buty-4-hydroxytoluene | (parts) | | | | | | | | 2.5 | | | |
| Imidazole | (parts) | | | | | | | | | 2.5 | | |
| n-stearyl alcohol | (parts) | | | | | | | | | | | 2.5 |
| 1-hexadecanol | (parts) | | | | | | | | | | | |
| Hexamethylene diaminecarbamate | (parts) | 2.4 | 2.4 | 2.4 | 2.4 | 2.4 | 2.4 | 2.4 | 2.4 | 2.4 | 2.4 | 2.4 |
| 1,8-diazabicyclo[5,4,0]-undecene-7 60% product | (parts) | 4 | 4 | 4 | 4 | 4 | 4 | 4 | 4 | 4 | 4 | 4 |
| Dicyclohexyl amine salt of ethyleneglycol 80% and long chain alcohol 20% (NOCMASTER EGS) | (parts) | | | | | | | | | | | |
| Processability | | | | | | | | | | | | |
| Compound Mooney viscosity | | 90 | 86 | 72 | 93 | 87 | 90 | 89 | 93 | 78 | 101 | 91 |
| Scorch stability | | | | | | | | | | | | |
| Scorch time t35 | (min) | 13.8 | 16.8 | 17.9 | 19.8 | 22.9 | 14.8 | 14.6 | 14.1 | 13.9 | 12.3 | 12.4 |
| Compression set resistance | | | | | | | | | | | | |
| Compression set (O-ring shape) | (%) | 37 | 37 | 40 | 38 | 42 | 37 | 38 | 38 | 43 | 40 | 41 |

Example 10

Except for using, instead of 2.5 parts of 2-propanol, 2.5 parts of 1,2-propanediol and 2.5 parts of glycerin, the same procedure was followed as in Example 1 to prepare a cross-linkable nitrile rubber composition and the same procedure was followed to evaluate it. The results are shown in Table 2.

Example 11

Except for changing the amount of 1,2-propanediol from 2.5 parts to 5 parts and the amount of glycerin from 2.5 parts to 5 parts respectively, the same procedure was followed as in Example 10 to prepare a cross-linkable nitrile rubber composition and the same procedure was followed to evaluate it. The results are shown in Table 2.

Example 12

Except for using, instead of 2.5 parts of 2-propanol, 2.5 parts of 1,2-propanediol and using, as the basic cross-linking prepare a cross-linkable nitrile rubber composition and the same procedure was followed to evaluate it. The results are shown in Table 2.

Example 13

Except for using, instead of 2.5 parts of 1,2-propanediol, 2.5 parts of glycerin, the same procedure was followed as in Example 12 to prepare a cross-linkable nitrile rubber composition and the same procedure was followed to evaluate it. The results are shown in Table 2.

Example 14

Except for using, instead of 2.5 parts of 1,2-propanediol, 2.5 parts of imidazole, the same procedure was followed as in Example 12 to prepare a cross-linkable nitrile rubber composition and the same procedure was followed to evaluate it. The results are shown in Table 2.

Example 15

Except for using, as the compound (C), in addition to 2.5 parts of 1,2-propanediol, 2.5 parts of glycerin, the same procedure was followed as in Example 12 to prepare a cross-linkable nitrile rubber composition and the same procedure was followed to evaluate it. The results are shown in Table 2.

Example 16

Except for changing the amount of 1,2-propanediol from 2.5 parts to 5 parts and the amount of glycerin from 2.5 parts to 5 parts, the same procedure was followed as in Example 15 to prepare a cross-linkable nitrile rubber composition and the same procedure was followed to evaluate it. The results are shown in Table 2.

Example 18

Except for jointly using as the compound (C), in addition to 2.5 parts of glycerin, 2.5 parts of diethyleneglycol, the same procedure was followed as in Example 13 to prepare a cross-linkable nitrile rubber composition and the same procedure was followed to evaluate it. The results are shown in Table 3.

Example 19

Except for changing the amount of hexamethylene diamine carbamate from 2.4 parts to 2.8 parts, the same procedure was followed as in Example 4 to prepare a

TABLE 2

|  |  | Example | | | | | | |
|---|---|---|---|---|---|---|---|---|
|  |  | 10 | 11 | 12 | 13 | 14 | 15 | 16 |
| Composition of cross-linkable rubber composition | | | | | | | | |
| Carboxyl group-containing nitrile rubber (A-1) | (parts) | 100 | 100 | 100 | 100 | 100 | 100 | 100 |
| FEF carbon black | (parts) | 40 | 40 | 40 | 40 | 40 | 40 | 40 |
| Tri-2-ethylhexyl trimellitate | (parts) | 5 | 5 | 5 | 5 | 5 | 5 | 5 |
| 4,4'-di-(α,α-dimethylbenzyl)diphenylamine | (parts) | 1.5 | 1.5 | 1.5 | 1.5 | 1.5 | 1.5 | 1.5 |
| Stearic acid | (parts) | 1 | 1 | 1 | 1 | 1 | 1 | 1 |
| Polyoxyethylene alkyl ether phosphoric acid ester | (parts) | 1 | 1 | 1 | 1 | 1 | 1 | 1 |
| 2-propanol | (parts) | | | | | | | |
| 1,2-propanediol | (parts) | 2.5 | 5 | 2.5 | | | 2.5 | 5 |
| Glycerin | (parts) | 2.5 | 5 | | 2.5 | | 2.5 | 5 |
| Ethyleneglycol | (parts) | | | | | | | |
| Diethyleneglycol | (parts) | | | | | | | |
| 3,5-di-t-buty-4-hydroxytoluene | (parts) | | | | | | | |
| Imidazole | (parts) | | | | | 2.5 | | |
| n-stearyl alcohol | (parts) | | | | | | | |
| 1-hexadecanol | (parts) | | | | | | | |
| Hexamethylene diaminecarbamate | (parts) | 2.4 | 2.4 | 2.4 | 2.4 | 2.4 | 2.4 | 2.4 |
| 1,8-diazabicyclo[5,4,0]-undecene-7 60% product | (parts) | 4 | 4 | | | | | |
| Dicyclohexyl amine salt of ethyleneglycol 80% and long chain alcohol 20% (NOCMASTER EGS) | (parts) | | | 4 | 4 | 4 | 4 | 4 |
| Processability | | | | | | | | |
| Compound Mooney viscosity | | 83 | 70 | 81 | 89 | 73 | 76 | 67 |
| Scorch stability | | | | | | | | |
| Scorch time t35 | (min) | 20.1 | 23.1 | 18.3 | 24.1 | 16.0 | 28.4 | >30 |
| Compression set resistance | | | | | | | | |
| Compression set (O-ring shape) | (%) | 36 | 42 | 38 | 39 | 38 | 36 | 40 |

(Note)
In the table, ">30" indicates a scorch time longer than 30 minutes.

Example 17

Except for changing the amount of 1,2-propanediol from 2.5 parts to 1.5 parts and the amount of glycerin from 2.5 parts to 3.5 parts respectively, the same procedure was followed as in Example 15 to prepare a cross-linkable nitrile rubber composition and the same procedure was followed to evaluate it. The results are shown in Table 3.

cross-linkable nitrile rubber composition and the same procedure was followed to evaluate it. The results are shown in Table 3.

Comparative Example 3

Except for using, instead of 2.5 parts of 2-propanol, 2.5 parts of 1-hexadecanol, the same procedure was followed as in Example 1 to prepare a cross-linkable nitrile rubber composition and the same procedure was followed to evaluate it. The results are shown in Table 3.

TABLE 3

|  |  | Example | | | Comparative Example |
| --- | --- | --- | --- | --- | --- |
|  |  | 17 | 18 | 19 | 3 |
| Formulation | | | | | |
| Carboxyl group-containing nitrile rubber (A-1) | (parts) | 100 | 100 | 100 | 100 |
| FEF carbon black | (parts) | 40 | 40 | 40 | 40 |
| Tri-2-ethylhexyl trimellitate | (parts) | 5 | 5 | 5 | 5 |
| 4,4'-di-(α,α-dimethylbenzyl)diphenylamine | (parts) | 1.5 | 1.5 | 1.5 | 1.5 |
| Stearic acid | (parts) | 1 | 1 | 1 | 1 |
| Polyoxyethylene alkyl ether phosphoric acid ester | (parts) | 1 | 1 | 1 | 1 |
| 2-propanol | (parts) | | | | |
| 1,2-propanediol | (parts) | 1.5 | | | |
| Glycerin | (parts) | 3.5 | 2.5 | | |
| Ethyleneglycol | (parts) | | | 2.5 | |
| Diethyleneglycol | (parts) | | 2.5 | | |
| 3,5-di-t-butyl-4-hydroxytoluene | (parts) | | | | |
| Imidazole | (parts) | | | | |
| n-stearyl alcohol | (parts) | | | | |
| 1-hexadecanol | (parts) | | | | 2.5 |
| Hexamethylene diaminecarbamate | (parts) | 2.4 | 2.4 | 2.8 | 2.4 |
| 1,8-diazabicyclo[5,4,0]-undecene-7 60% product | (parts) | | | 4 | 4 |
| Dicyclohexyl amine salt of ethyleneglycol 80% and long chain alcohol 20% (NOCMASTER EGS) | (parts) | 4 | 4 | | |
| Processability | | | | | |
| Compound Mooney viscosity | | 82 | 85 | 91 | 93 |
| Scorch stability | | | | | |
| Scorch time t35 | (min) | >30 | 28.8 | 14.5 | 12.8 |
| Compression set resistance | | | | | |
| Compression set (O-ring shape) | (%) | 39 | 38 | 46 | 41 |

(Note)
In the table, ">30" indicates a scorch time longer than 30 minutes.

As shown in Tables 1 to 3, a cross-linkable nitrile rubber composition comprising a carboxyl group-containing nitrile rubber (A) in which a polyamine cross-linking agent (B) and at least one compound (C) selected from an aliphatic alcohol (c1) having 1 to 9 carbon atoms, hydroxyl group-containing aromatic compound (c2), and nitrogen-containing heterocyclic compound (c3) is mixed is excellent in processability (low in compound Mooney viscosity), is excellent in scorch stability (long in scorch time), and, further, is excellent in compression set resistance when made into an O-ring shape, can promise excellent sealing ability, and is suitable for application as a seal member (Examples 1 to 19).

Further, among Examples 1 to 19 as well, Examples 2 to 7, 10 to 13 and 15 to 19 where a polyvalent aliphatic alcohol having 1 to 9 carbon atoms were used were particularly excellent in scorch stability and were particularly good in results.

On the other hand, when not adding the compound (C), the obtained cross-linkable nitrile rubber composition was high in compound Mooney viscosity and inferior in processability and, furthermore, was short in scorch time and inferior in scorch stability (Comparative Example 1).

Further, when using, instead of the compound (C), an n-stearyl alcohol (aliphatic alcohol having 18 carbon atoms) or 1-hexadecanol (aliphatic alcohol having 16 carbon atoms), the obtained cross-linkable nitrile rubber composition was short in scorch time and inferior in scorch stability (Comparative Examples 2 and 3).

The invention claimed is:

1. A cross-linkable nitrile rubber composition comprising a carboxyl group-containing nitrile rubber (A) with an iodine value of 120 or less, polyamine cross-linking agent (B), at least one compound (C) selected from the group consisting of an aliphatic alcohol (c1) having 1 to 9 carbon atoms, and an hydroxyl group-containing aromatic compound (c2), and at least one of a carbon black and a silica, wherein the polyamine cross-linking agent (B) is hexamethylenediamine carbamate.

2. The cross-linkable nitrile rubber composition according to claim 1 wherein the compound (C) is the aliphatic alcohol (c1) having 1 to 9 carbon atoms.

3. The cross-linkable nitrile rubber composition according to claim 2 wherein the aliphatic alcohol (c1) having 1 to 9 carbon atoms is a polyvalent aliphatic alcohol having 1 to 9 carbon atoms.

4. The cross-linkable nitrile rubber composition according to claim 1, wherein the aliphatic alcohol (c1) has 2 to 9 carbon atoms, and the composition comprises, as the compound (C), two or more types of the aliphatic alcohol (c1).

5. The cross-linkable nitrile rubber composition according to claim 1 further comprising a basic cross-linking accelerator having a cyclic amidine structure.

6. The cross-linkable nitrile rubber composition according to claim 1 further comprising a basic cross-linking accelerator represented by the following general formula (1):

$$R^1 - NH - R^2 \quad (1)$$

where, in the general formula (1), $R^1$ and $R^2$ respectively independently are substituted or unsubstituted alkyl group having 1 to 12 carbon atoms, or substituted or unsubstituted cycloalkyl group having 5 to 12 carbon atoms.

7. A cross-linked rubber obtained by cross-linking the cross-linkable nitrile rubber composition according to claim 1.

8. A seal member made from the cross-linked rubber according to claim 7.

9. The cross-linkable nitrile rubber composition according to claim 1 wherein the compound (C) is the aliphatic alcohol (c1) and comprises a monovalent alcohol.

10. The cross-linkable nitrile rubber composition according to claim 1 wherein the compound (C) is the aliphatic alcohol (c1) and comprises a linear polyvalent alcohol having 2 to 6 carbon atoms.

11. The cross-linkable nitrile rubber composition according to claim 1 wherein the carbon black is present.

12. The cross-linkable nitrile rubber composition according to claim 1 wherein the compound (C) is the aliphatic alcohol (c1) and comprises a mixture of polyvalent aliphatic alcohols.

13. The cross-linkable nitrile rubber composition according to claim 12 wherein the mixture is a mixture of a divalent aliphatic alcohol and a trivalent or higher aliphatic alcohol at a weight ratio of 10:1 to 1:10.

14. The cross-linkable nitrile rubber composition according to claim 13 wherein the weight ratio is 3:7 to 7:3.

15. The cross-linkable nitrile rubber composition according to claim 1 wherein the compound (C) is the hydroxyl group-containing aromatic compound (c2).

16. The cross-linkable nitrile rubber composition according to claim 15 wherein the aromatic compound (c2) has a phenolic hydroxyl group.

17. The cross-linkable nitrile rubber composition according to claim 15 wherein the aromatic compound (c2) has two phenolic hydroxyl groups.

* * * * *